(12) United States Patent
Lavi

(10) Patent No.: US 11,144,758 B2
(45) Date of Patent: Oct. 12, 2021

(54) SYSTEM AND METHOD FOR OBJECT DETECTION AND CLASSIFICATION IN AERIAL IMAGERY

(71) Applicant: GEOX GIS INNOVATIONS LTD., Petach Tikva (IL)

(72) Inventor: Itzhak Lavi, Petach Tikva (IL)

(*) Notice: Subject to any disclaimer, the term of this patent is extended or adjusted under 35 U.S.C. 154(b) by 0 days.

(21) Appl. No.: 16/683,293

(22) Filed: Nov. 14, 2019

(65) Prior Publication Data

US 2020/0160030 A1 May 21, 2020

Related U.S. Application Data

(60) Provisional application No. 62/767,794, filed on Nov. 15, 2018, provisional application No. 62/767,774, filed on Nov. 15, 2018.

(51) Int. Cl.
*G06K 9/00* (2006.01)
*G06T 7/90* (2017.01)
*G06T 17/05* (2011.01)

(52) U.S. Cl.
CPC .......... *G06K 9/0063* (2013.01); *G06T 7/90* (2017.01); *G06T 17/05* (2013.01); *G06T 2207/10032* (2013.01)

(58) Field of Classification Search
CPC .......... G06K 9/0063; G06K 2209/27; G06K 9/6292; G06K 9/4642; G06K 9/00637;
(Continued)

(56) References Cited

U.S. PATENT DOCUMENTS

2002/0196974 A1* 12/2002 Qi ................... H04N 5/147
382/170
2011/0110580 A1   5/2011 Akbari et al.
(Continued)

FOREIGN PATENT DOCUMENTS

EP    1323132 B1    12/2012
JP    4946072 B2     6/2012

OTHER PUBLICATIONS

Chen et al, "Fusion of LIDAR Data and High Resolution Images for Forest Canopy Modeling", Proc. 26th Asian Conference on Remote Sensing, Dec. 31, 2005, Center for Space and Remote Sensing Research, National Central University Jhong-Li, Taiwan.
(Continued)

*Primary Examiner* — Ali Bayat
(74) *Attorney, Agent, or Firm* — Alphapatent Associates, Ltd.; Daniel J. Swirsky

(57) ABSTRACT

A method for detecting objects of a specified class in an aerial image of an area, including manipulating first and second features related to each element of the image according to image metadata and pre-configured rules, selecting a first group of elements complying with a first condition related to the first feature, the first condition based on the image metadata and the pre-configured rules, selecting a second group of elements complying with a second condition related to the second feature, the second condition based on the image metadata and the pre-configured rules, and creating a representation of the area from elements common to the first group and the second group, the representation including elements belonging to the objects of the specified class.

14 Claims, 18 Drawing Sheets

(58) Field of Classification Search
CPC . G06T 7/90; G06T 17/05; G06T 2207/10032; G06T 2207/10024; G06T 2207/20021; G06T 2207/10028; G06T 5/002; G06T 5/003; G06T 7/75
USPC .......................................................... 382/103
See application file for complete search history.

(56) References Cited

U.S. PATENT DOCUMENTS

| | | | |
|---|---|---|---|
| 2011/0220091 A1* | 9/2011 | Kroyzer | F24S 50/20 126/572 |
| 2013/0022287 A1 | 1/2013 | Hooper | |
| 2013/0238290 A1* | 9/2013 | Angevine | G06Q 50/16 703/1 |
| 2013/0300740 A1* | 11/2013 | Snyder | G06F 3/016 345/420 |
| 2014/0081605 A1 | 3/2014 | Susaki | |
| 2014/0142904 A1* | 5/2014 | Drees | G06Q 50/06 703/2 |
| 2018/0157911 A1 | 6/2018 | Lo et al. | |
| 2019/0384969 A1* | 12/2019 | Shimauchi | G06K 9/4642 |
| 2020/0364513 A1* | 11/2020 | Asendorf | G06K 9/4642 |

OTHER PUBLICATIONS

Liu, et al., "Automatic estimation and removal of noise from a single image", IEEE Transactions on Pattern Analysis and Machine Intelligence, Dec. 31, 2007, pp. 299-314, vol. 30, No. 2, IEEE Computer Society, Washington, D.C., USA.

Minin, "Quantification and Extraction of Surface Features from Digital Terrain Models", Faculty of Mathematics and Sciences, Brock University, 2016, St. Catharines, Ontario, Canada.

Lisein, et al., "A Photogrammetric Workflow for the Creation of a Forest Canopy Height Model from Small Unmanned Aerial System Imagery", Forests, Nov. 6, 2013, p. 922, vol. 4, No. 4, MDPI, Basel, Switzerland.

* cited by examiner

Fig. 9

SYSTEM AND METHOD FOR OBJECT DETECTION AND CLASSIFICATION IN AERIAL IMAGERY

CROSS REFERENCE TO RELATED APPLICATIONS

This application claims priority and benefit from U.S. Provisional Patent Application Nos. 62/767,774 and 62/767,794, both filed Nov. 15, 2018, both of which are incorporated herein by reference.

FIELD

The present invention relates to deciphering aerial photographs generally and to detecting and classifying objects in aerial images using computer vision in particular.

BACKGROUND

In aerial photography (or airborne imagery), photographs of the surface are taken from above from any flying vehicle such as a satellite; an aircraft; a helicopter; an unmanned aerial vehicle (UAV); a drone etc. The photographs are taken by dedicated equipment mounted on the flying vehicle and triggered automatically or manually by a local or a remote operator.

Equipment for taking the aerial photograph may include a camera (e.g. a digital camera); an electro-optical device; an infrared device; a synthetic-aperture radar (SAR); an interferometric synthetic aperture radar (IfSAR) device; a light detection and ranging (LiDAR) appliance or any other device capable of capturing information regarding the underlying area and creating one or more models of the landscape (e.g. a point cloud—a set of data points in space, each point associated with information such as its x, y and z coordinates, and its color; a digital image, each pixel associated with color; a digital surface model (DSM), each pixel associated with a height above the terrain providing the top of objects (e.g. tree canopy and buildings) etc.). Each model may be created by different equipment and may include different information regarding the underlying surface.

In addition to the image, the generated information may include parameters related to the equipment and related to the conditions associated with the taken image (image metadata). The information may include the camera brand and model; details related to the equipment sensors; the date and time when the image was created; the global positioning system (GPS) location where the image was created and the like. In addition, the information may include the camera details and settings at the time the image was created such as aperture, shutter speed, ISO number, focal depth, pixel density in dots per inch (DPI), pixel size, pixel count, camera angle and the like. Detecting objects in aerial images is required by various civil and military applications such as urban planning; cellular antenna placement; cartography; building irregularities detection; real-estate marketing; surveying buildings and plots; commercial advertising; risk management in insurance policies; archaeology, military intelligence and many others.

The object detection task is challenging. When done manually, it is time consuming, labor intensive, expensive and error prone. Some computer-implemented tools were developed in order to automate the task however they do not provide the needed quality and accuracy. The outcome of these tools does not meet the expected quality in terms of the single object description (providing the correct data regarding the detected object) and the expected error rate (how many objects out of the total were correctly described).

SUMMARY

There is provided, in accordance with an embodiment of the present invention, a method for detecting objects of a specified class in an aerial image of an area. The method includes the following steps: manipulating first and second features related to each element of the image according to image metadata and pre-configured rules, selecting a first group of elements complying with a first condition related to the first feature, the first condition based on the image metadata and the pre-configured rules, selecting a second group of elements complying with a second condition related to the second feature, the second condition based on the image metadata and the pre-configured rules, and creating a representation of the area from elements common to the first group and the second group, the representation includes elements belonging to the objects of the specified class.

Furthermore, in accordance with an embodiment of the present invention, the elements comprise points in a point cloud.

Still further, in accordance with an embodiment of the present invention, the elements are pixels, the first feature is color in an RGB raster representation, and the second feature is height in a DSM raster representation.

Moreover, in accordance with an embodiment of the present invention, the manipulating includes magnifying differences between features of pixels in each representation and changing irregular features of pixels in each representation to features of most adjacent pixels.

Additionally, in accordance with an embodiment of the present invention the step of selecting a first group includes constructing object surfaces from pixels of the representation, detecting edges of each object surface, and selecting pixels belonging to the surfaces inside the edges.

Moreover, in accordance with an embodiment of the present invention, the step of constructing object surfaces includes creating a reference representation by subtracting a predefined value from each pixel in the DSM raster, dividing the DSM raster to first tiles having a first pre-determined size, computing an average value of all pixels in each tile to create a tile average, subtracting the tile average from the reference representation to create an elevation value for each pixel, selecting pixels whose elevation value is positive to create a first group of selected pixels, and constructing the object surfaces from the pixels of the first group.

Furthermore, in accordance with an embodiment of the present invention, the method also includes dividing the DSM raster to second tiles having a second pre-determined size, repeating the steps of computing, subtracting and selecting for the second tiles to create a second group of selected pixels, and constructing the object surfaces from the pixels of the first group and the pixels of the second group.

Still further, in accordance with an embodiment of the present invention, the step of detecting edges includes computing a first incline for each pixel using the height feature of adjacent pixels in the DSM raster, computing a second incline value for each pixel using the first incline of adjacent pixels in the DSM raster, and selecting pixels having a second incline value that is higher than a predefined threshold.

Additionally, in accordance with an embodiment of the present invention, the step of selecting a second group includes creating a monochrome representation based on metadata rules by modifying the color feature of each pixel in the RGB raster and selecting pixels in the monochrome representation having a color feature complying with the second condition.

There is also provided, in accordance with an embodiment of the present invention, a system for creating a graphic representation of objects of a specified class detected in aerial images of an area, the system implemented on at least one processor and memory, the system includes a metadata handler to select rules based on image metadata, a pre-processing module to manipulate first and second features related to each element of the image according to the selected rules. The system also includes a first detection module to create a first group of elements complying with a first condition related to the first feature, the first condition based on the selected rules, a second detection module to create a second group of elements complying with a second condition related to the second feature, the second condition based on the selected rules, and a combination module to create the graphic representation containing elements common to the first group and the second group which is the graphic representation of the objects of the specified class Additionally, in accordance with an embodiment of the present invention, the elements include points in a point cloud.

Moreover, in accordance with an embodiment of the present invention, the elements are pixels, the first feature is color in an RGB raster representation, and the second feature is height in a DSM raster representation.

Furthermore, in accordance with an embodiment of the present invention, the pre-processing module is configured to magnify differences between features of pixels in each representation and change irregular features of pixels in each representation to features of most adjacent pixels.

Still further, in accordance with an embodiment of the present invention, the first detection module includes a top-level constructor to create object surfaces of the objects and a vertical edge detector to detect edges of the object surfaces in which the first group of pixels includes pixels of surfaces inside the edges.

Additionally, in accordance with an embodiment of the present invention, the top-level constructor is configured to divide the DSM raster to first tiles having a pre-determined size, compute an average height of all pixels in each tile to create a tile average height, subtract the tile average height from a height of each pixel to create an elevation value for each pixel, select pixels with positive elevation value to create a first group of selected pixels; and create object surfaces from the pixels of the first group.

Furthermore, in accordance with an embodiment of the present invention, the top-level constructor is configured to divide the DSM raster to second tiles having a second pre-determined size, repeat the steps of dividing, computing, subtracting and selecting for the second tiles, and create a second group of selected pixels, and create object surfaces from pixels in the first group and pixels in the second group.

Moreover, in accordance with an embodiment of the present invention, the second detection module is configured to create a monochrome representation applying the selected rules on the color feature of each pixel in the RGB raster, select pixels in the monochrome representation with a color feature complying with the second condition.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 9 is a schematic illustration of an example of a DSM raster grid before and after the operation of the condition detector of FIG. 7;

Figure 1:
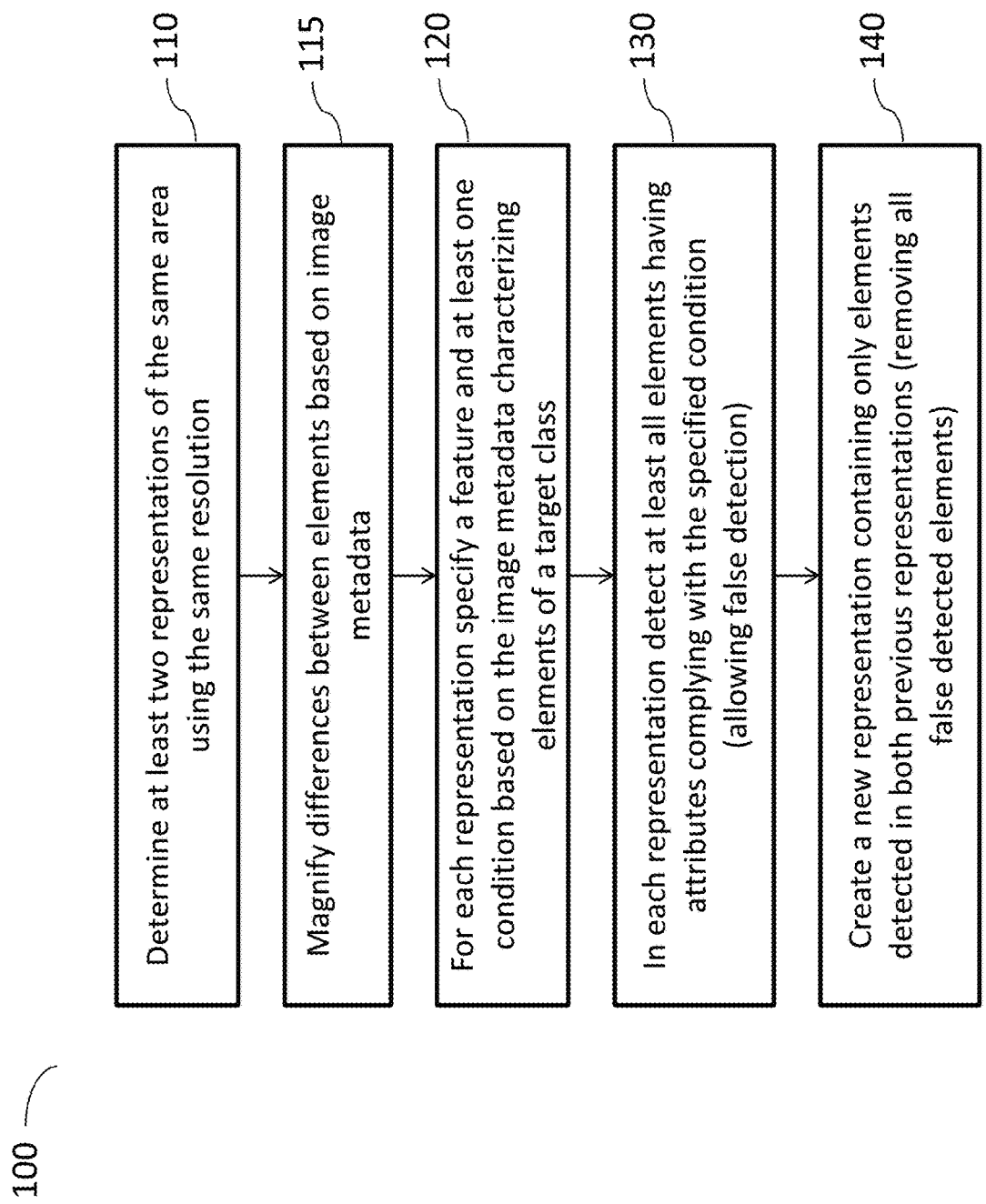
FIG. 1 is a schematic illustration of a flow of a system constructed and operative in accordance with embodiments of the present invention.

It will be appreciated that for simplicity and clarity of illustration, elements shown in the figures have not necessarily been drawn to scale. For example, the dimensions of some of the elements may be exaggerated relative to other elements, for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, features and components have not been described in detail so as not to obscure the present invention. In the accompanied drawings, similar numbers refer to similar elements in different drawings.

Methods and systems according to embodiments of the present invention are directed at detecting specific objects from aerial imagery providing an improved quality of object detection and classification compared with the prior art.

Many types of objects may be captured by aerial photography e.g. buildings, trees, cars, water bodies and the like. Each captured object may belong to a specific class of objects (e.g. palm trees and oak trees may belong to the class "trees") and in many applications it is desired to detect all objects (also named "target objects") in the captured image, that belong to a specific class (also named "target class").

Objects belonging to the same class may share common features, such as color; shape; width; height and the like. The features common to a class may be identifiable in a model created by the aerial imagery. For example, the height of a building is typically more than 5 meters (identifiable in a surface model) and the color of a typical tree is a shade of green (identifiable in a color image).

Some of these features may be used to differentiate between objects belonging to different classes. For example, the height of an object with respect to the ground may be used to differentiate between cars and building since cars are typically significantly lower than buildings.

One model of an underlying surface is a digital aerial image also referred herein as a color image. The color image may include any suitable color scheme such as RGB (three numerical values: red (R), green (G) and blue (B)); CMYK (four numeric values: cyan (C), magenta (M), yellow (Y), and key (black) (K)); LAB color space (three numerical values: lightness (L) green-red (A) and blue-yellow (B)) and the like.

Another model is a 3-D point cloud (e.g. a set of vectors of discrete points created for example by an airborne LiDAR) which can be used to derive a digital surface model (DSM) (an interpolated raster grid, generally a rectangular grid of pixels) of discrete points that provides the height related to each pixel. The DSM provides the elevation model of the surface, with respect to the terrain, that includes the tops of buildings, trees, powerlines, and any other detected object.

It may be noted that the structure of some objects includes a significant top flat surface such as the roof of a building, the roof of a car, the water surface and the like. The top flat plane of an object is referred herein as an object-surface. It may also be noted that an object-surface may include more than one plane, referred herein as the levels of the surface. For example, building tops may include a main roof on which additional structures, such as elevator machine rooms, may be located. In these cases, the roof may be referred herein as the object-surface of the main (or first) level, and the top of the elevator machine room may be referred as the object-surface of the secondary level.

A model (e.g. a color image raster grid, a DSM raster grid, a point cloud and any combination thereof) may be divided to numerous overlapping representations, each representation used to associate and separate different type of information and each representation includes at least one feature characterizing the target class. For example, one representation (e.g. a color representation) may include the color feature of the objects. In a color representation, each element of the representation (e.g. pixel in a color raster grid) may contain a color feature. Another representation (e.g. a DSM representation) may represent the height feature of the objects. In a DSM representation, each element (pixel in a DSM raster grid) may contain a height feature. It should be noted that multiple features of the same element may be part of several representations (i.e. a pixel may have both color and height features in a single digital file).

It may be appreciated that the pixel size of the different models may vary from very low to very high. For example, a model may cover less than one square centimeter of area per pixel in a raster grid, hundreds of meters of an area per pixel in the raster grid and any value in between. It may also be appreciated that representations may be created by different equipment; may contain different features and may have different resolution.

It may also be appreciated that vertical photographs are often used to create orthophotos (also known as orthophotomaps) photographs which have been geometrically "corrected" so as to be usable as a map. In these cases, the image may contain "noise"—i.e. pixels in the image that seem to be part of a real object but are not.

Embodiments of the present invention provide systems and methods for analyzing models created by aerial imagery and automatically detecting objects belonging to a target class based on their features as reflected by the representations and on the metadata associated with the representations. Systems and methods of the present invention are based on computer vision techniques.

FIG. 1, to which reference is now made, is a schematic illustration of a flow 100 implemented by systems constructed in accordance with an embodiment of the present invention.

In step 110 the system may obtain at least two representations of the same area having the same resolution, each representation associated with a different feature. For example, one of the representations may be an RGB raster grid representing the color feature of the image and the other representation may be a DSM raster grid representing the height feature of the image.

In step 115, the system may manipulate the features in each representation. The manipulation may comprise magnifying the differences between features of elements of the raster grid by applying functions on each element. The functions may depend on the image metadata and on preconfigured metadata rules, each rule associated with a set of specific values of metadata. The metadata rules may cover possible combination of values of the different parameters contained in the image metadata.

In step 120, for each representation the system may specify a condition related to a feature associated with elements (i.e. pixels) of a target class. For example, when the target class is "trees" and the representations are RGB raster grid and DSM raster grid, the features may be the "color" associated with each pixel and the "height" associated with each pixel. The conditions may be configured as part of the metadata rules and therefore may depend on the actual metadata associated with the representations. The condition related to the feature "color" may be "color=specific values of R, G, B" and the condition related to the feature "height" may be "height>specific height". The value of the color channels and the height in the condition may depend for example on the GPS location, the time of day and the camera angle at the time the image was created. For example, if the color image was taken from the west in the morning the color condition may consider the size and the location of shadows.

In step 130, the system may detect in each representation all elements complying with the specified condition. It should be noted that elements belonging to other classes may also be (falsely) detected in this step if they comply with the condition, but these false detections are allowed in this step. An example of a false detection in a DSM raster grid may be in the case of a target class "buildings", feature "height" and condition "higher than five meters". In this case, pixels belonging to very high trees, higher than five meters will comply with the condition and thus will also be detected although they do not belong to the target class.

In step 140, the system may create a new representation containing only elements detected in all previous representations (the intersection between the elements of all representations). This step may remove all falsely detected elements that comply with one of the conditions only. Returning to the example of target class "buildings", with the feature "height" and the condition "higher than five meters" the other feature may be "color" and the condition may be "artificial" (i.e., having a color of an object which is not of a natural source). In this case, trees may be detected in the first representation as they may be higher than five meters however, trees may not be detected in the second representation as they have a color of an object of a natural source (and not a color of an artificial source). The resultant raster grid may include only pixels detected by both conditions in both representations, leaving the trees out.

In one embodiment, the representations may use the same model (e.g. the same point cloud) if the information included in the model contains at least two different features associated with each point. (E.g., each point in a point cloud model is associated with both color and height, and thus may be used in both representations).

Figure 2A:
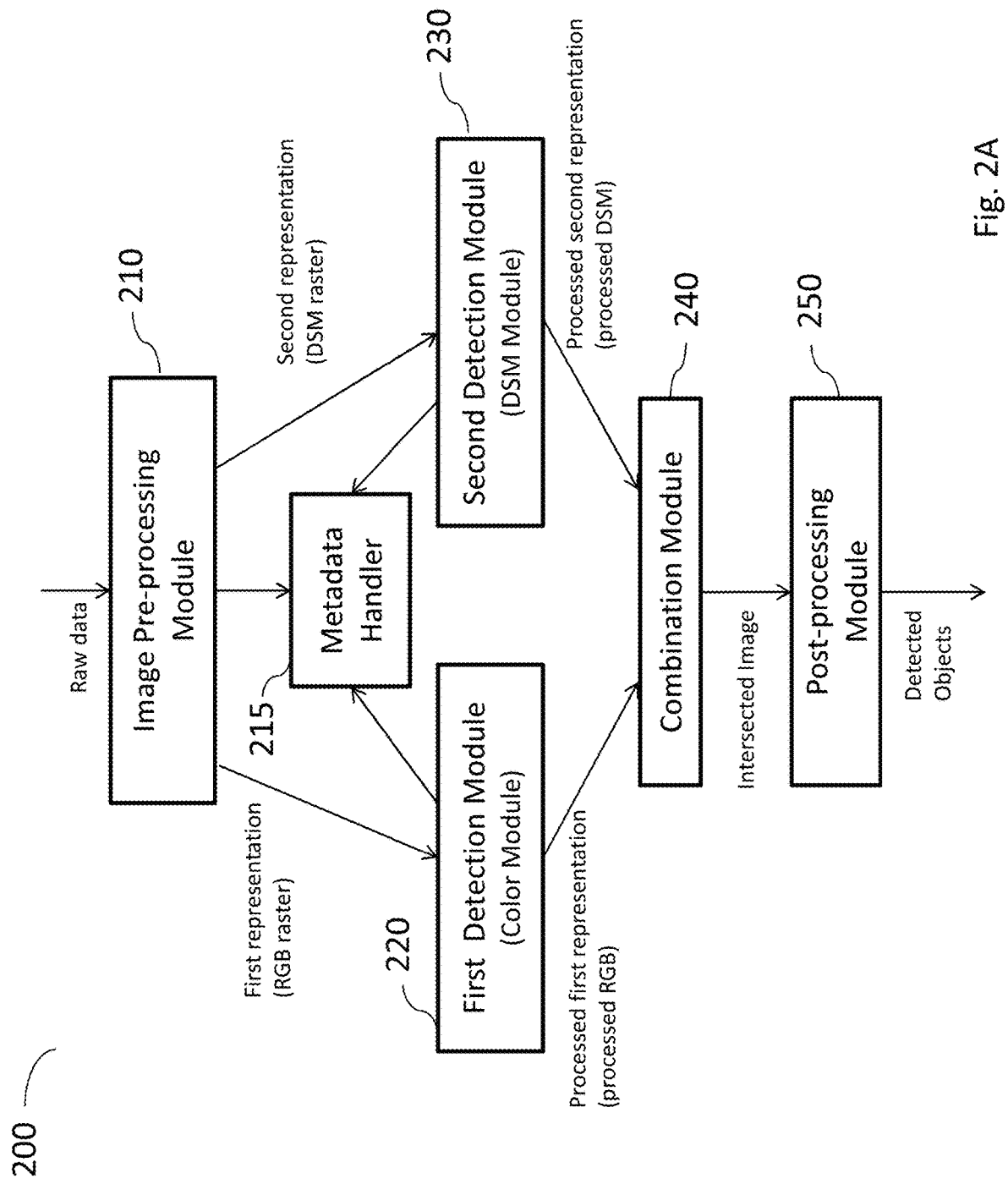
FIG. 2A is a schematic illustration of a system for object detection and classification in aerial imagery, constructed and operative in accordance with embodiments of the present invention implementing the flow of FIG. 1.

FIG. 2A, to which reference is now made, schematically illustrates a system 200 implementing flow 100 of FIG. 1. System 200 comprises an image pre-processing module 210, a metadata handler 215, a first detection module 220, a second detection module 230; a combination module 240 and a post-processing module 250. An example of first detection module 220 may be a color module handling a color raster and an example of a second detection module 230 handling a DSM raster may be a DSM module.

Metadata handler 215 may comprise rules including functions, state machines decision tables and the like, for correct handling the images taken by different equipment in different conditions indicated by the metadata (i.e. different time of day, different location, different dates and the like). Two images of the same area may be handled by different rules, based on the parameters of the metadata associated with each image. For example, metadata handler 215 may include rules how to manipulate the elements in different combinations of GPS location, date and time, camera angles and the like. For example, a function or a parameter of the system may depend on the time of day (i.e. when the time of day is 05:00-12:00 and the GPS indicates a location between specific altitudes and longitudes use a specific value or a specific function while when the time of day is 12:00-20:00 in the same GPS location use another function). Parameters of the system may depend on the specific combination of metadata parameters. Metadata handler 215 may select the rules according to the image metadata.

Image pre-processing module 210 may receive raw data from which first and second representations may be created, and metadata may be extracted. The raw data may comprise one or more partial aerial models that include point clouds, digital images with color information (e.g., RGB, CMYK, LAB color space, etc.), infra-red (IR) radiation information, and digital models such as DSMs (e.g., from any source, including LiDAR, real-time DSM sensors, sensor for post-producing DSM, calculation from a plurality of aerial images of the area, or any combination thereof). The raw data may also include orthophotos or tiles of orthophotos. Image pre-processing module 210 may support any format of the raw data (e.g. raster, vector) compressed or uncompressed and any other form of data containing information related to the area of interest and the metadata and any combination thereof.

Figure 2B:
FIG. 2B is an example of an RGB raster used as a first representation of an area created by aerial imagery.
Figure 2C:
FIG. 2C is an example of a DSM raster used as a second representation of an area created by aerial imagery.

Image pre-processing module 210 may combine and stitch the raw data to form one full image covering the entire area of interest using any known suitable technique to create the full image. Once a full image is created image pre-processing module 210 may create two representations, each providing at least information related to a specific feature of the target class. In the example of system 200, image pre-processing module 210 may obtain from the raw data a color raster grid, as shown in FIG. 2B, as the first representation and a DSM raster grid, as shown in FIG. 2C, as the second representation.

Image pre-processing module 210 may extract from the raw data the image metadata including camera brand and model, the type of sensors, the date, time and GPS associated with the representation, the aperture, shutter speed, ISO number, focal depth, pixel density in dots per inch (DPI), pixel size, pixel count, camera angle and the like. Image pre-processing module 210 may use metadata handler 215 to receive the rules to use during the processing.

In one embodiment image pre-processing module 210 may ensure that the two representations have the same resolution. If the raw data includes data created by different equipment such as digital images created by a digital camera and a DSM created by LiDAR, the resolution of the representations may differ. In this case, image pre-processing module 210 may adjust the resolution of both representations, for example, as described herein below with respect to FIG. 10.

It may also be appreciated that the raw data may be a point cloud, in which points are spread randomly, providing information associated with only some of the pixels, not all. In one embodiment, image pre-processing module 210 may use any known technique (e.g. interpolation) suitable for filling in the missing information in the point cloud (missing points) in order to build a color raster grid and a DSM raster grid.

First detection module 220, which receives the first representation from image pre-processing module 210, may detect all elements in the first representation complying with a condition associated with the first feature and second detection module 230, which receives the second representation from image pre-processing module 210, may detect all elements in the second representation complying with a condition associated with the second feature. In one embodiment, first detection module 220 may be implemented as a color module (feature is color) capable of detecting all pixels in a color raster grid having a color complying with some conditions, and second detection module 230 may be implemented as a DSM module capable of detecting all pixels in a DSM raster grid (feature is height) complying with some conditions.

First detection module 220 and second detection module 230 may use metadata handler 215 to determine the actual conditions to apply which may be different for different values of parameters of the image metadata.

First detection module 220 and second detection module 230 may process data in any format, e.g. uncompressed or compressed, raster or vector formats, and may, for example, rasterize different formats to a grid of pixels to enhance the speed of computation.

Combination module 240 may select elements that were detected by both first detection module 220 and second detection module 230 (the intersection between detected elements of both representations) and create a new representation containing those selected elements. It may be noted that selecting an element may be implemented by marking the detected element by a specific mark, by removing an existing mark from the detected element and leaving the mark on the other elements, or by any other method capable of differentiating between selected and non-selected elements.

It may be noted that the basic structure of first detection module 220 and second detection module 230 may be similar as described with respect to FIG. 3A and FIG. 5 herein below and may comprise a feature sharpener. The feature sharpener may magnify the differences between objects of the target class and other objects in each specific representation by performing a calculation on each element and creating an adjusted value for each element. The calculations may be based on rules provided by metadata handler 215 taking into consideration the image metadata parameters. The adjusted value may enhance the contrast between objects of the target class and other objects in each specific representation. In one embodiment, one or more operations of the feature sharpener may be implemented by pre-processing module 210.

Figure 3A:
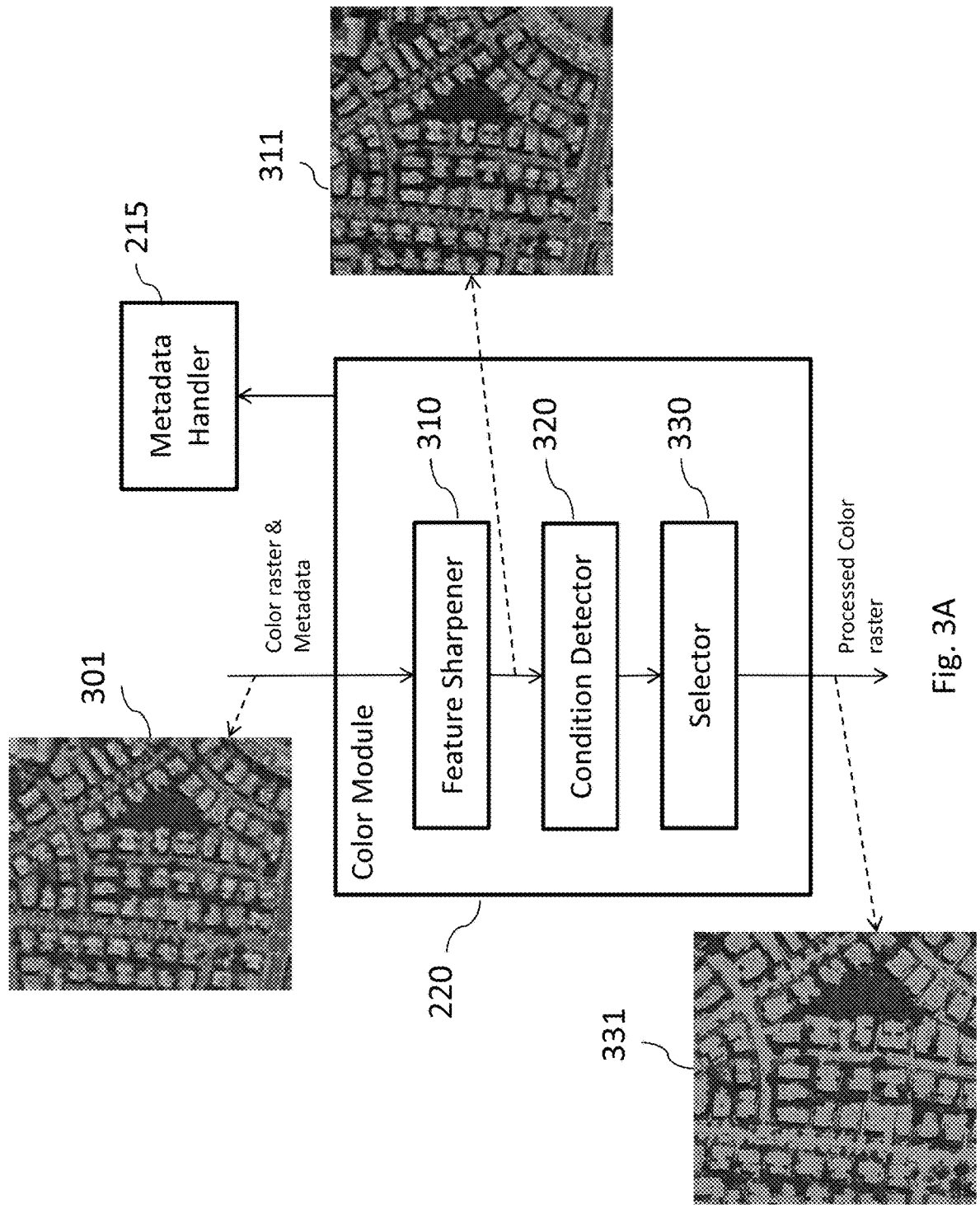
FIG. 3A is a schematic illustration of a color module of the system of FIG. 2A, constructed and operative in accordance with embodiments of the present invention.

FIG. 3A, to which reference is now made, is a schematic illustration of a color module embodiment of first detection module 220 which comprises a feature sharpener 310, a condition detector 320 and a selector 330. Image 301 is an example of a color raster grid representation used as input for color module 220.

Feature sharpener 310 may adjust the values of the color by performing a calculation, defined by the rules provided by metadata handler 215, on the value of the color of each pixel in the color raster grid and creating a color adjusted value for each pixel. Feature sharpener 310 may refine the color and contrast between elements in the color raster received from image pre-processing module 210 and may remove noise.

Figure 3B:
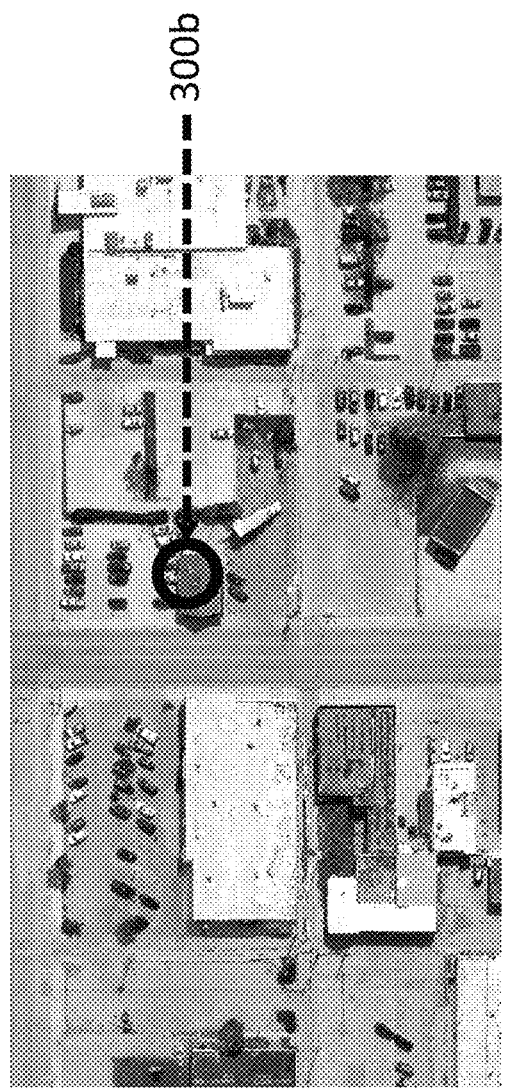
FIG. 3B is an example of an RGB raster used as input for color module of FIG. 3A.

For example, color module 220 may receive an RGB color raster grid. It is known that an RGB color may be specified with three channels: red (R), green (G) and blue (B), each channel defines the intensity of the color as an integer between 0 and 255. FIG. 3B is an example of an RGB raster input with an example of what is considered to be noise surrounded by a circle marked by arrow 300*b*. Feature sharpener 310 may modify the values of the R; G and B channels of the color of each pixel (based on the input from metadata handler 215) and thereby enhance the colors and the contrast between pixels. Feature sharpener 310 may, for example, use rules associated with a parameter indicating a specific sensor. The rule for the specific sensor may be to add the number 10 to all channels having a value greater than 100 and subtract 10 from all channels having a value smaller than 100. The rule for another type of sensor may be to add 20 and subtract 20. Image 311 is an example of the result of the actions performed by feature sharpener 310 on image 301.

Figure 3C:
FIG. 3C is an example of an RGB raster after the operation of a color sharpener of color module of FIG. 3A on the RGB raster of FIG. 3B.

Feature sharpener 310 may also remove noise by changing the value of pixels having exceptional values to an average value. For example, if the majority of pixels in a specific part of the image are associated with specific average values (e.g. R=100; G=100; B=100) and a minority of pixels in the same area are irregular and are associated with considerably different values (e.g. R=200; G=200; B=200), feature sharpener 310 may change the value of those irregular pixels to the value of most adjacent pixels to remove what is considered to be "noise" (e.g. shadow). FIG. 3C is an example of an RGB raster after the operation of feature sharpener 310, where the location cleared from "noise" surrounded by a circle pointed by arrow 300*c*. The term "noise" is used here in to indicate pixels that should appear "as is" in the final representation comprising objects of the target class and may pose a disturbance.

Condition detector 320 may check the value of the elements of the representation and check their compliance with a predefined condition. In an example of the embodiment of color detection module 220, the representation may be an RGB considering the channels R, G and B and condition detector 320 may differentiate between pixels according to the values of the different channels of the color (values that may depend on the image metadata and condition that may depend on the pre-configured metadata rules). In one embodiment condition detector 320 may differentiate between pixels belonging to a natural substance and pixels belonging to an artificial substance based on the values of the R G B channels of each pixel and the configuration of metadata handler 215.

Figure 3D:
FIG. 3D is an example of an RGB raster after the operation of a color sharpener of the color module of FIG. 3A.
Figure 3E:
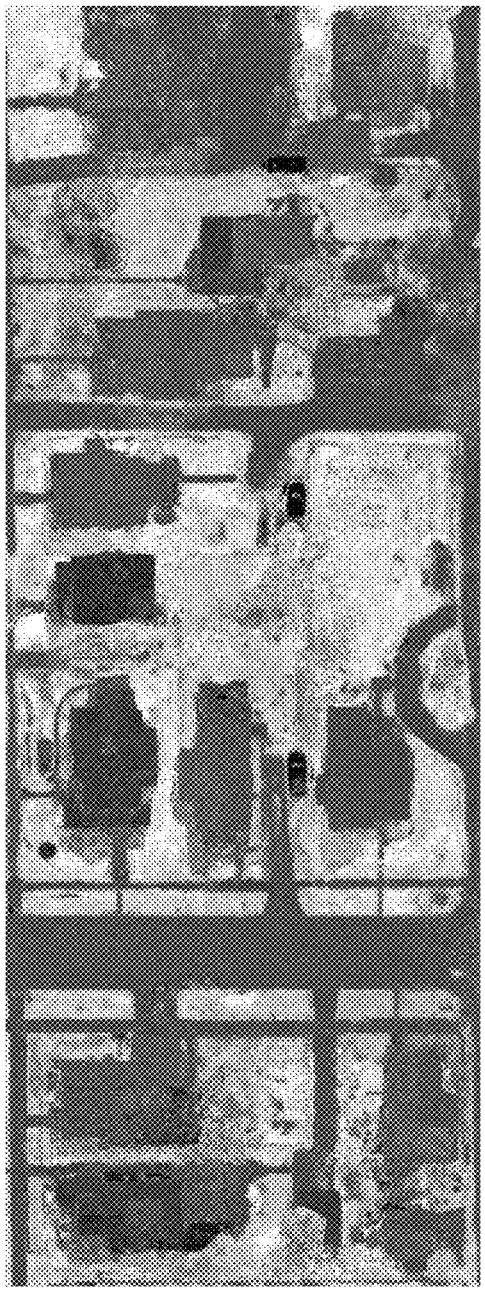
FIG. 3E is an example of an RGB raster after the operation of a condition detector of the color module of FIG. 3A on the RGB raster of FIG. 3D.

FIG. 3D is an example of an RGB raster used as input to color module 220, and FIG. 3E is an example of the outcome of the operation of condition detector 320 where a pixel belonging to a more artificial substance is darker and a pixel belonging to a more natural substance is brighter.

Example of a condition related to color, handled by condition detector 320, aimed at detecting green objects in a specific location and time may be "pixels having a value of G higher than 150 and value of R and B lower than 100" or "pixels having a value of (G/R) greater than 1".

Selector 330 may select all pixels detected by condition detector 320 and create a representation (a processed color raster) having only detected elements. In one embodiment, for an RGB raster, the new representation, containing only detected pixels, may have a specific value in the R, G and B channels. (For example, the values of the R, G and B channels in the new representation may be zero, thereby creating a black mask on the selected pixels; the values of the R, G and B channels may be set to 255 thereby creating a white mask on the selected pixels; the values of R, G and B channels may be set to a predefined value creating a color mask on the selected pixels). In one embodiment selector 330 may "mark" all non-selected pixels, leaving selected pixels untouched in the new representation. Image 331 is an example of the result of the action made by selector 330 on image 311.

Figure 4:
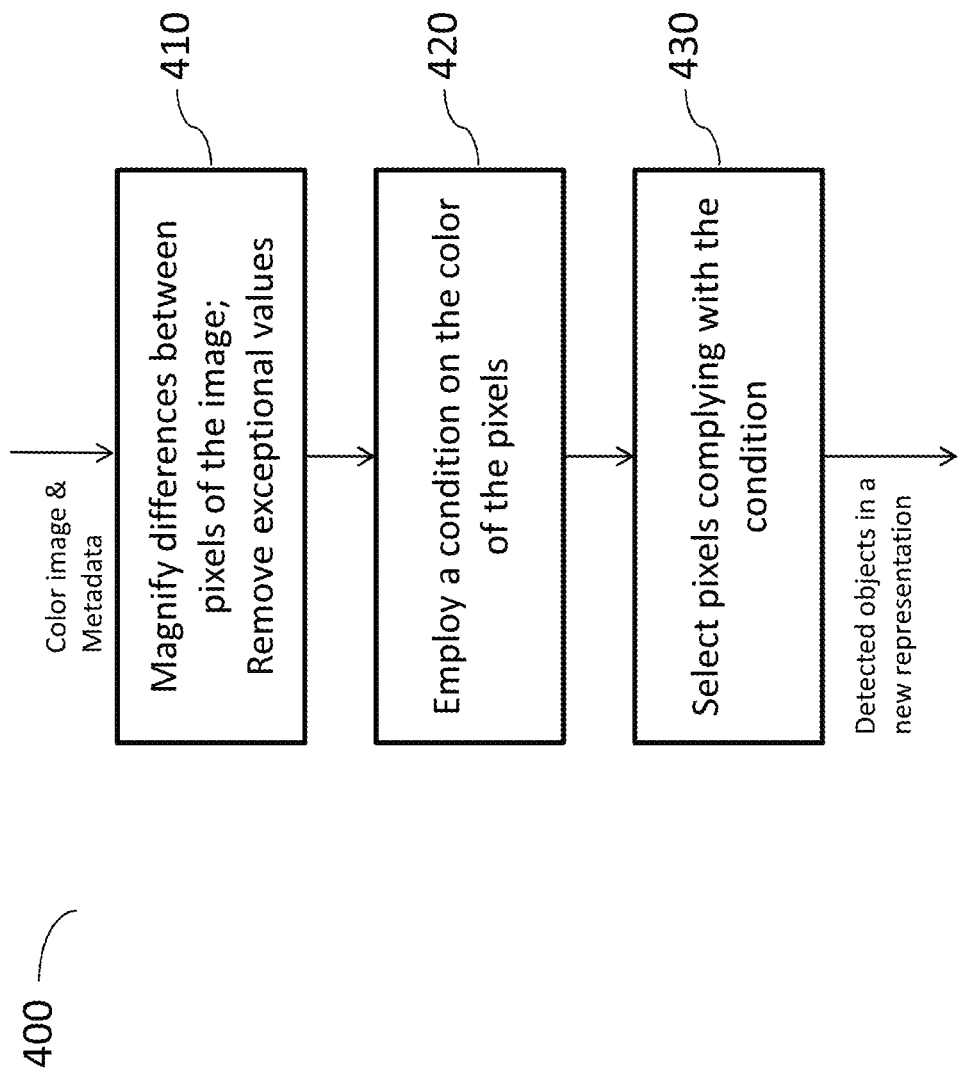
FIG. 4 is a schematic illustration of a flow performed by the color module of FIG. 3A, constructed and operative in accordance with embodiments of the present invention.

FIG. 4, to which reference is now made, describes a flow 400 performed by color module 220. In step 410 feature sharpener 310 may magnify the differences between elements of the target class and element of other classes. Feature sharpener 310 my use the information extracted from the image metadata and consult metadata handler 215 to determine how to modify the color of each pixel in the representation (e.g., as described above). In step 420 condition detector 320 may detect all pixels complying with the defined condition based on the new value of the color of each pixel, the image actual metadata and the information provided by metadata handler 215. In step 430 selector 330 may select all detected pixels.

In one embodiment, first detection module 220 may first modify the color image to a monochrome image using metadata rules complying with the image metadata and perform the different processing steps on the monochrome representation.

Figure 5:
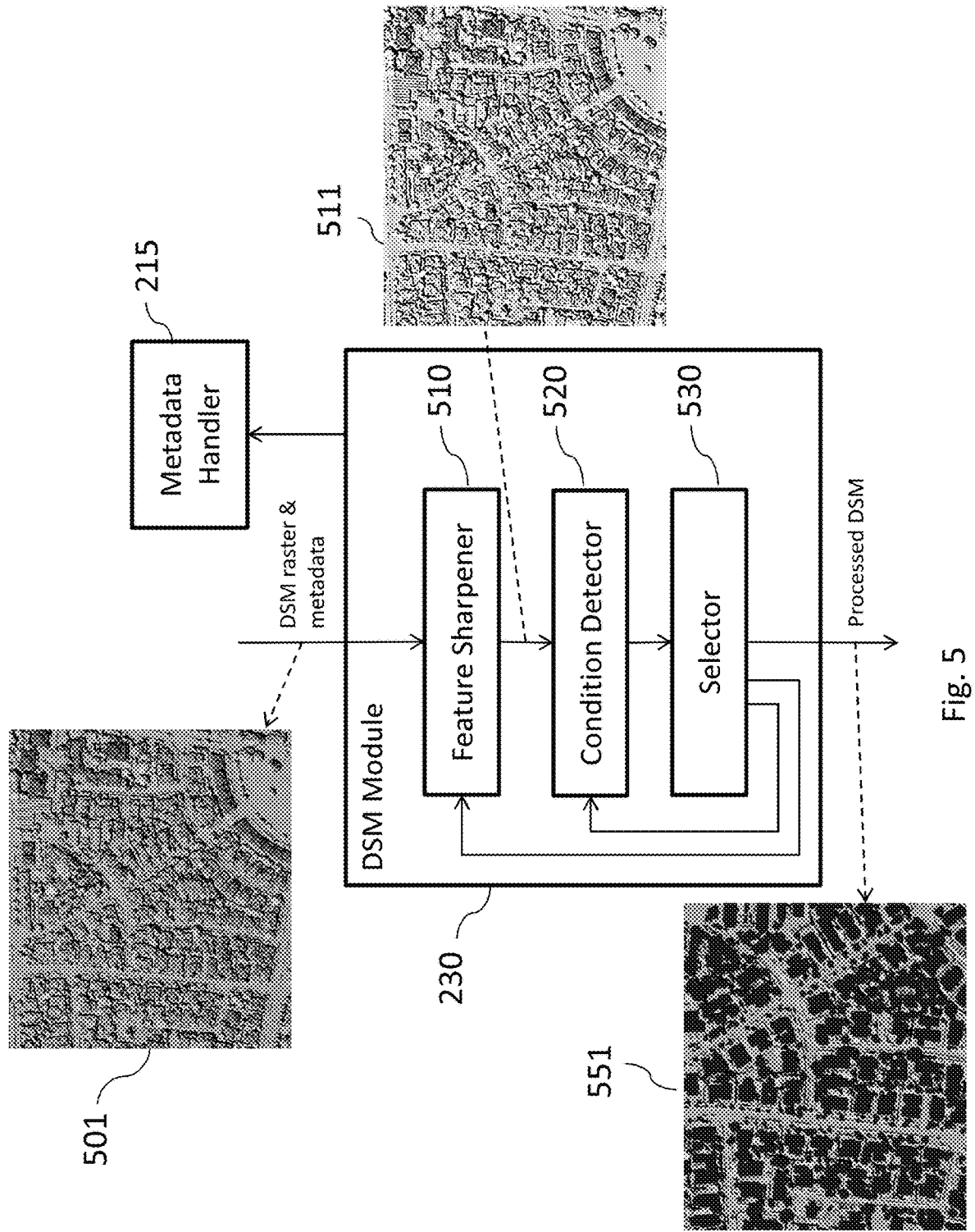
FIG. 5 is a schematic illustration of a DSM module of the system of FIG. 2A, constructed and operative in accordance with embodiments of the present invention.

FIG. 5, to which reference is now made, is a schematic illustration of a DSM module embodiment of second detection module 230 which comprises a feature sharpener 510; a condition detector 520 and a selector 530. In DSM module 230, the feature of the representation is the height of the objects, reflected by the height of each pixel. It may be appreciated that in an urban area there is a clear difference in height between different objects therefore a DSM may be utilized as a useful representation to classify objects in an urban environment.

Feature sharpener 510 may adjust the values of the height of each element (pixel) in order to magnify the differences between objects of the target class and other objects. Feature sharpener 510 may also remove what is considered to be "noise".

Feature sharpener 510 may emphasize the height difference between pixels belonging to target objects and pixels belonging to other objects in the specific image using the specific image metadata. The differences may be emphasized by performing calculations on the value of the height of each element in the representation and creating a height adjusted value to pixels in the DSM raster. The actual calculation depends on the rules provided by metadata handler 215 based on the actual parameters of the image metadata. Feature sharpener 510 may scale up the height value associated with each pixel in the DSM raster. Scaling up the height may depend on the pixel size and may be done for example by multiplying the height value associated with each pixel by a value obtained from metadata handler 215 (e.g. 8, 10 and the like); by squaring the height value or performing any other mathematical operation defined by metadata handler 215.

Figure 6:
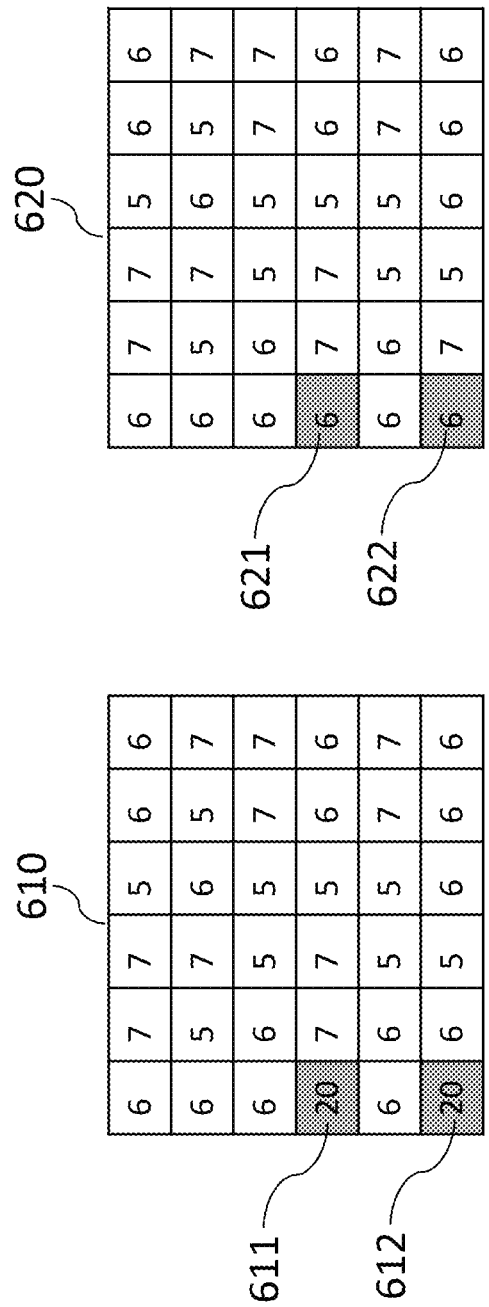
FIG. 6 is a schematic illustration of an example operation of the DSM module of FIG. 5.

In addition, feature sharpener 510 may remove "noise" by changing the value of pixels having exceptional values to an average value. For example, as illustrated in FIG. 6 to which reference is now made, if the majority of pixels in a specific part of the image are associated with specific average values (e.g. 6) and a minority of pixels in the same area (pixels marked with reference numerals 611 and 612) are irregular and are associated with considerably different values (e.g. 20), it is assumed to be an error and feature sharpener 510 may change the value of those irregular pixels to the average value of the majority of pixels (e.g. new value 6 for pixels marked with reference numerals 621 and 622) and remove what is considered to be "noise".

Feature sharpener 510 may also create a DSM reference representation, which is a version of a DSM raster used by system 200 as a reference point, by decreasing the height of all pixels of the original DSM by a predefined value, determined according to the target class and the information provided by metadata handler 215. The DSM reference representation may also be used to eliminate "noise" representing pixels belonging to elements which are not considered to belong to the target class. For example, if the target class is "buildings" feature sharpener 510 may subtract a predetermined value (e.g. two meters) from all pixels in the DSM, creating a DSM reference representation in which pixels belonging to cars may not be detected. In one embodiment, one or more operations of feature sharpener 510 may be implemented by pre-processing module 210.

Figure 7:
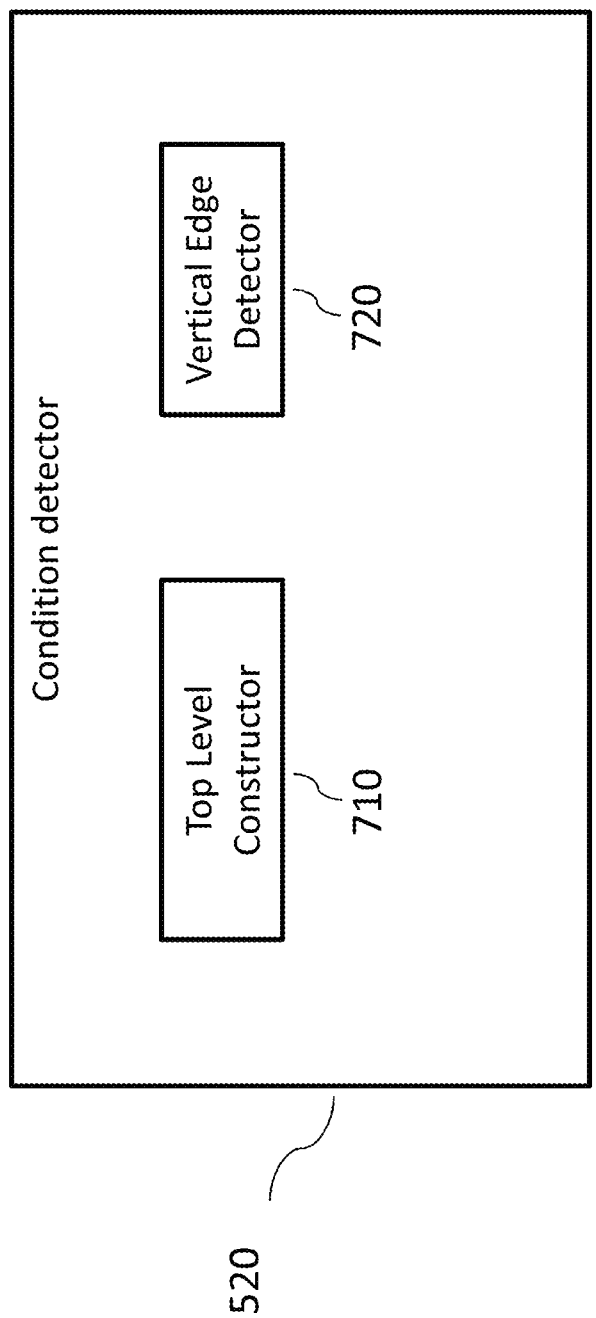
FIG. 7 is a schematic illustration of a condition detector part of the DSM module of FIG. 5, constructed and operative in accordance with embodiments of the present invention.

FIG. 7, to which reference is now made, is a schematic illustration of condition detector 520 that may detect pixels belonging to the target class and comprises a top-level constructor 710 and a vertical edge detector 720. It may be appreciated that when an object has more than one level of surface, top-level constructor 710 may detect each level of the surface.

Condition detector 520 may specify the level to be detected. For example, if the target class is "buildings", the first level to be detected may be the main roof of the buildings. As mentioned above, in some cases, there are constructions on top of the buildings (a machine room of an elevator) and even structures on top of the constructions. Usually there are no more than one or two levels of surfaces in a building, but system 200 (FIG. 2A), constructed and operative in accordance with a preferred embodiment of the present invention, may support any number of levels.

Top-level constructor 710 may locate the pixels belonging to a specific level of an object-surface of the target class by repeatedly dividing the DSM raster (the DSM raster after applying the pre-processing operations) to parts of a predetermined size (10 pixels, 12 pixels and the like), each part referred herein as a tile; computing the average height in each tile (to obtain a tile average height), subtracting the computed average from the DSM reference representation, creating an elevation value for each pixel and selecting pixels from each tile having an elevation value higher than zero (i.e. pixels whose height is larger than the average).

In one embodiment, top-level constructor 710 may add a predefined value to the calculated average (instead of subtracting the predefined value from the original DSM and creating a DSM reference representation) in order to avoid detecting pixels belonging to non-target objects.

In the main level, top-level constructor 710 may use a coarse granulation for the tile size. For example, top-level constructor 710 may start with a tile size 12 and increase the tile size in each round (e.g. 12, 16, 32, 50, 100, 150, 200, 250, and 500). The number of repeats and the size of the tiles may depend on the size of the target class, the pixel size (as reflected in the image metadata) and the resolution of the DSM.

It may be noted that using a smaller tile may lead to detecting pixels belonging to the borders of a target object while missing pixels belonging to an inner part of the object-surface. Using a larger tile, on the other hand, may lead to mistakenly detecting pixels which are not part of the target object in addition to detecting pixels belonging to the inner part of the object-surface and the borders, therefore, repeating the procedure with different tiles sizes improves the detection accuracy.

In one embodiment, the number of tiles may span between one to a large number, depending on the plane, the size of an average target object, the pixel size and the camera angle. When the upper level (i.e. third level) is analyzed, top-level constructor 710 may use a single tile which includes the entire object-surface and compute the average of all pixels in the single tile. In another embodiment top-level constructor 710 may compute the average of the pixels located only on the edges instead of using all the pixels of the object-surface.

In addition to detecting objects on top of the terrain such as buildings and trees, system 200 (FIG. 2A) may detect objects below the terrain such as mines, holes, digs and the like (i.e. detect object-surfaces below the terrain and not on top of the terrain). When used for detecting objects lower than the terrain, top-level constructor 710 may be operating as a bottom-level constructor and may select pixels from each tile having a value smaller than the average value of the tile to detect objects bellow the ground.

Vertical edge detector 720 may detect edges of objects in a DSM raster grid (e.g. originated from a device such as LiDAR). Vertical edge detector 720 may detect vertical angles (i.e. angles with respect to the axis z) by calculating the incline between consecutive pixels (i.e. adjacent pixels) and computing the incline between the computed inclines (i.e. creating a map of inclines by calculating the second derivative between adjacent pixels. A value in the second derivative, above a certain threshold may imply an edge of an object). Vertical edge detector 720 may detect angles, when the derivative is consistent along many pixels in a specific direction and is larger than zero. In one embodiment, the size of detectable angles may be between 15° and 90°.

Vertical edge detector 720 may handle right angles associated with buildings in the original DSM, i.e. the angles between the ground and the walls, and between the walls and the roof. Vertical edge detector 720 may also identify tile roofs when a sharp angle associated with a building is discovered.

Figure 8A:
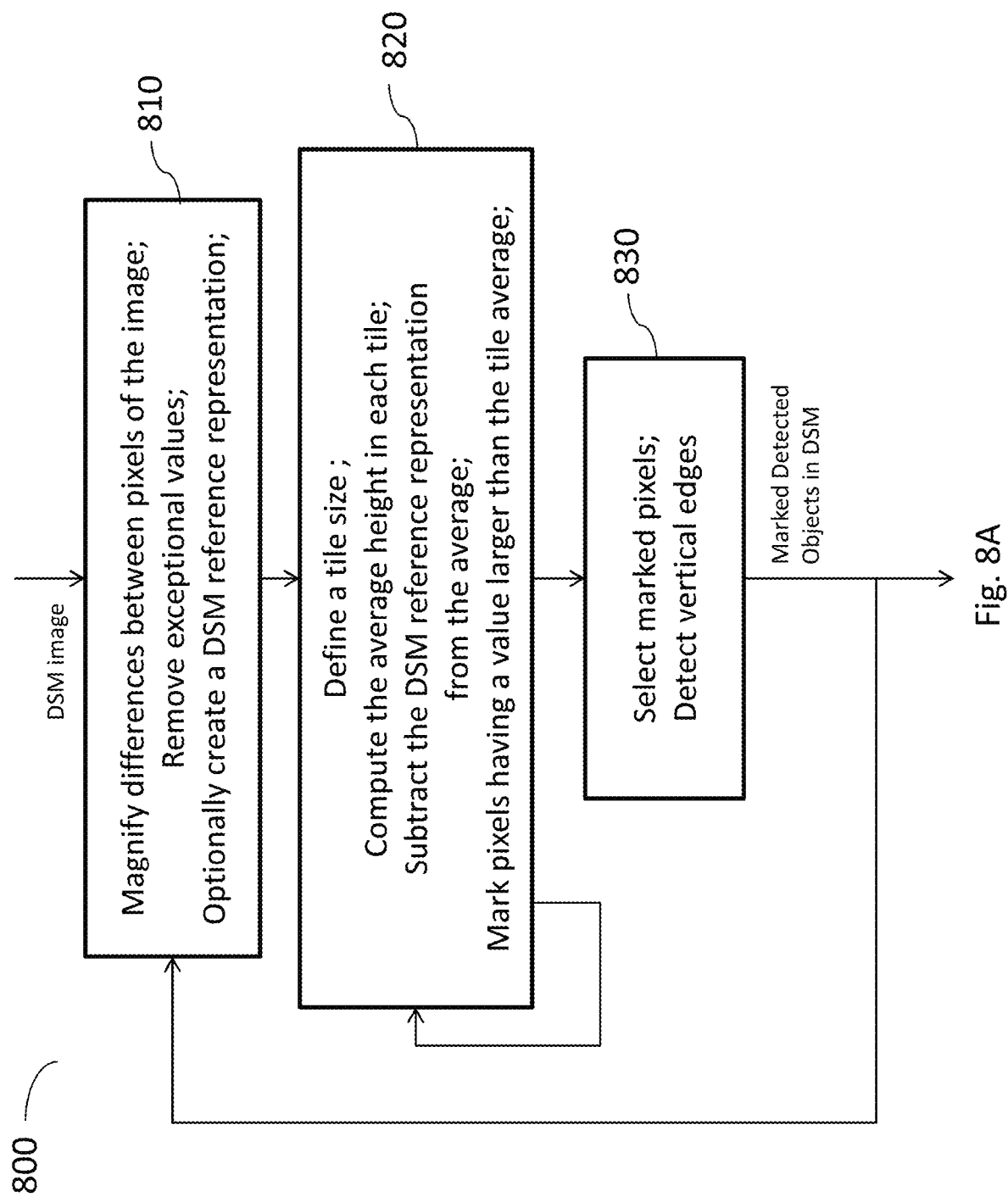
FIG. 8A is a schematic illustration of a flow performed by the DSM module of FIG. 5, constructed and operative in accordance with embodiments of the present invention.

FIG. 8A, to which reference is now made, describes a flow 800 performed by DSM module 230. In step 810 feature sharpener 510 may magnify the differences between pixels of the target object and pixels of other objects using information obtained from metadata handler 215 by for example scaling up the values associated with pixels in the DSM. Feature sharpener 510 may also remove "noise" and may create a DSM reference representation by increasing or decreasing the value of each pixel in order to later filter out pixels outside target objects that may be detected otherwise as they may have a value close to the average.

In step 820 condition detector 520 may define a tile size and may compute the average height associated with pixels in consecutive tiles. In step 830 condition detector 520 may select all pixels having a height larger than the tile average. Condition detector 520 may repeat steps 820 and 830 with different sizes of tiles and accumulate pixels detected in each round thereby detecting pixels belonging to both edges and inner parts of the object-surface of the target objects. All pixels detected by condition detector 520, in any one of the repetitions, may be part of the object-surface. As the tile size changes, the value of the average may also change, and different parts of the target object may be detected in each repetition. For each tile size, pixels belonging to the target class may be marked, and pixels outside the target class may remain un-marked since their height value may be smaller than the average.

In one embodiment, step 820 of FIG. 8A may operate on any raster grid of pixels to create a graphic representation of surfaces using any feature to compute a variance between pixels and an average value of the tile. Pixels having a positive or a negative variance may be identified as pixels belonging to surfaces characterized by the specified feature.

Figure 8B:
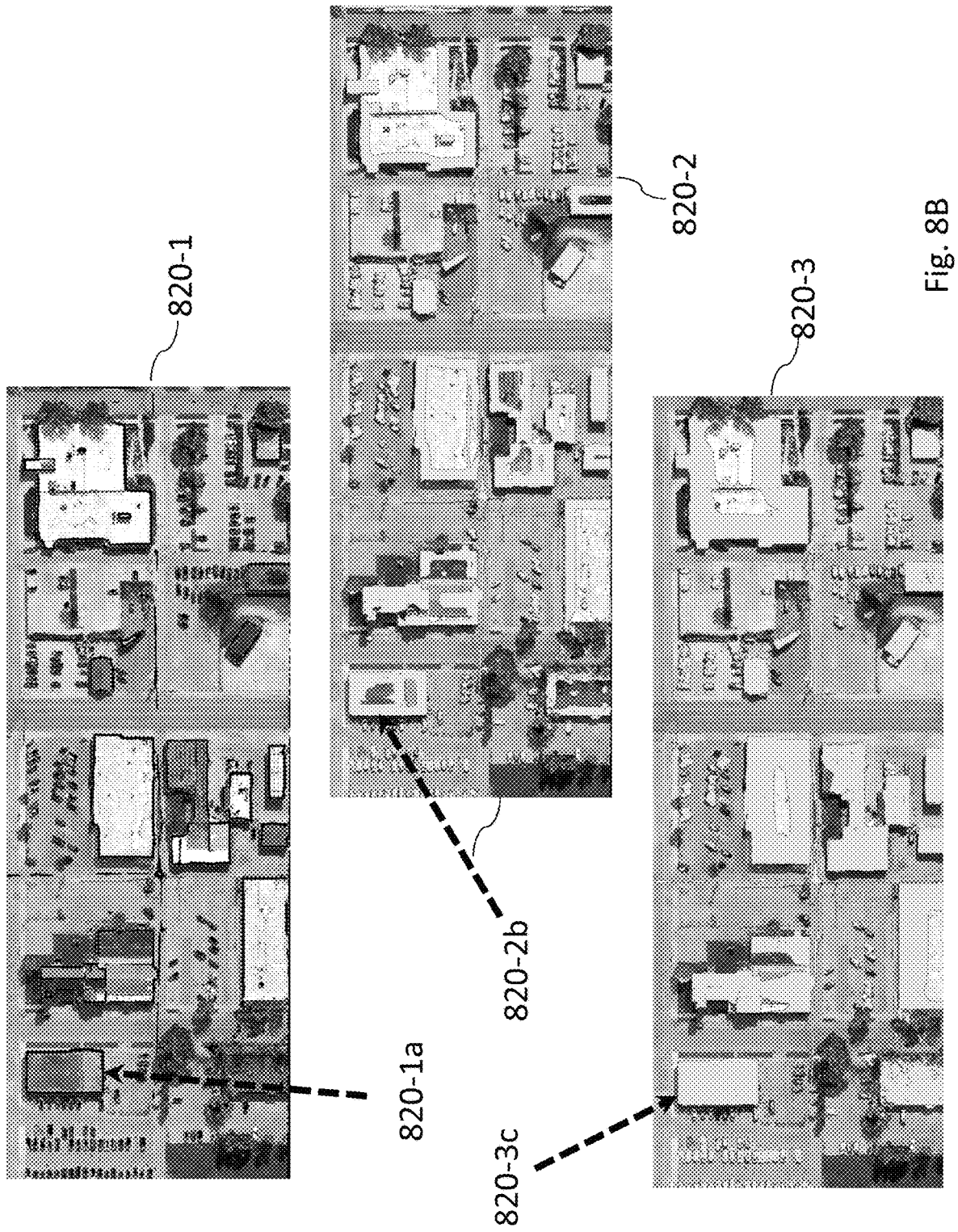
FIG. 8B is an example of the outcome of three iterations of the second step of the flow of FIG. 8A.
Figure 8C:
FIG. 8C is an example of the outcome of all iterations of the second step (computing an average) of the flow of FIG. 8A.

FIG. 8B, to which reference is now made, illustrates three examples of the outcome of the operation of condition detector 520 after three different iterations. DSM raster 820-1 is the outcome of an iteration in which the tile size is small. An example of detected pixels is pointed by arrow 820-1a. It can be noted that only a small part of the roof was detected using this tile size. DSM raster 820-2 is the outcome of an iteration in which the tile size is larger than the size in example 820-1. An example of detected pixels is pointed by arrow 820-2b. It can be noted that a larger part of the roof of the building was detected. DSM raster 820-3 is the outcome of an iteration in which the tile size is even larger than the size used in example 820-2. An example of detected pixels is pointed by arrow 820-3c. FIG. 8C, to which reference is now made, is the union of pixels detected by all iterations performed by condition detector 520 thereby detecting all pixels which are part of an object-surface.

When there are multiple levels to detect, DSM module 230 may remove all pixels not belonging to the main level, keeping only the information associated with objects detected in the main level. Once only the pixels of the main level remain, DSM module 230 may activate flow 800 on the resultant DSM representation. Feature sharpener 510 may magnify the differences between the levels by refining the height contrast between the secondary level and the main level, top-level constructor 710 of condition selector 520 may use a fine granulation for the tile size (e.g. 2, 3, 4 and 5 pixels) and selector 530 may thus select structures on top of the main level. DSM module 230 may repeat flow 800 for each level with the required adjustments.

Figure 9:
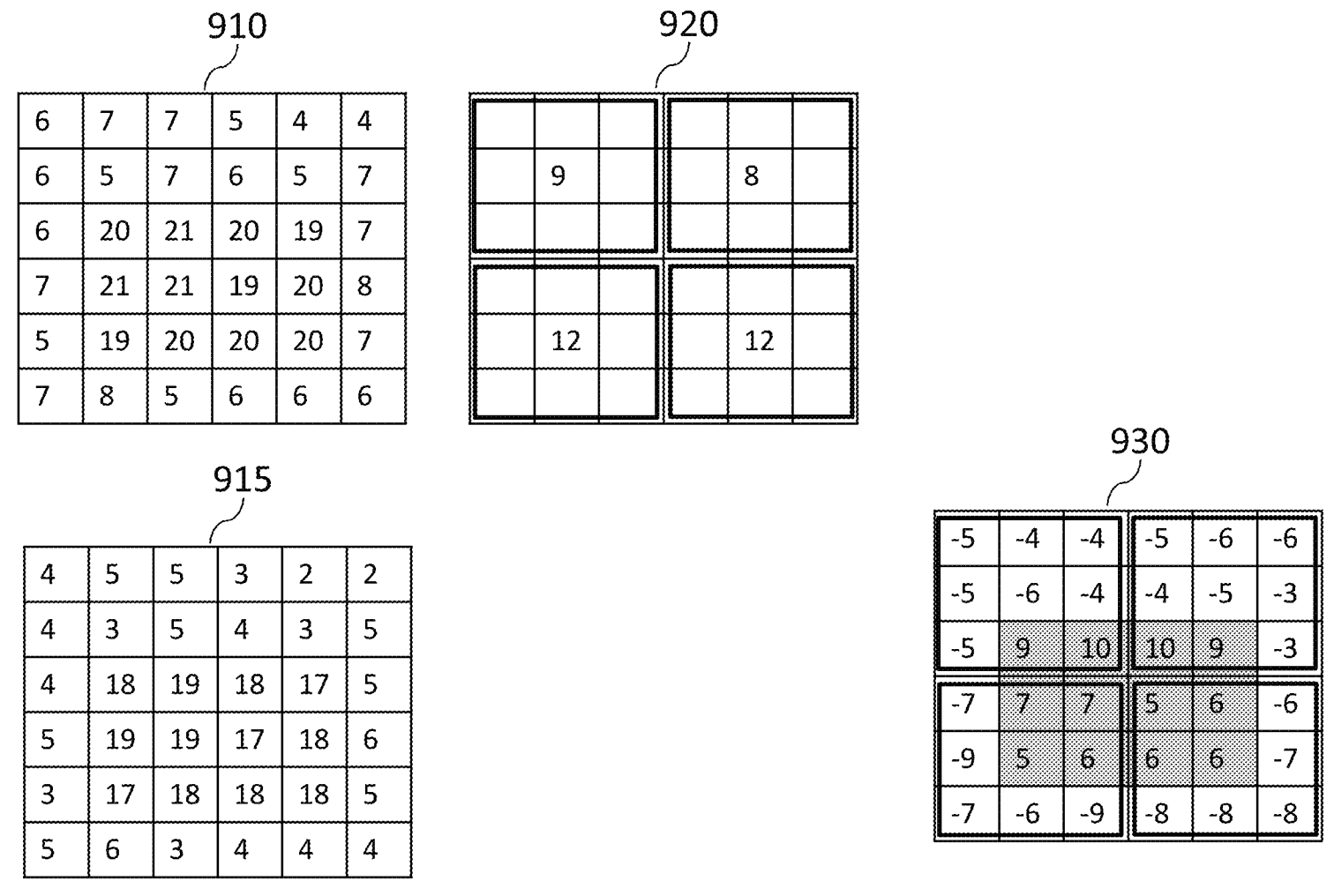

FIG. 9, to which reference is now made, is a schematic illustration of an example of a portion of a DSM raster grid 910 having 36 pixels and the outcome of the operations performed by condition detector 520 on DSM raster grid 910. Top-level constructor 710 may divide DSM raster grid 910 into 4 tiles of 9 pixels each and compute the average values of each tile as illustrated by DSM raster grid 920. Top-level constructor 710 may subtract the average value of each pixel from DSM reference representation 915 (created by feature sharpener 510 of FIG. 5) and may mark only pixels having a value larger than zero as indicated by DSM raster grid 930.

In one embodiment, feature sharpener 510, when operating to detect a secondary level, may remove pixels of the previous level close to the edge of detected objects to ensure detecting structures only within the frames of the objects detected in the previous level.

In one embodiment, condition detector 520 may use pixels only from the edges of the detected objects and use the height of these pixels for computing the average instead of computing an average of multiple tiles as described herein above.

In one embodiment the detection accuracy degree may be defined by a user of system 200 (FIG. 2A). The accuracy degree may depend for example, on the sizes of the tiles used for computing the object-surface of the target class, the number of levels to explore and the like.

Figure 10:
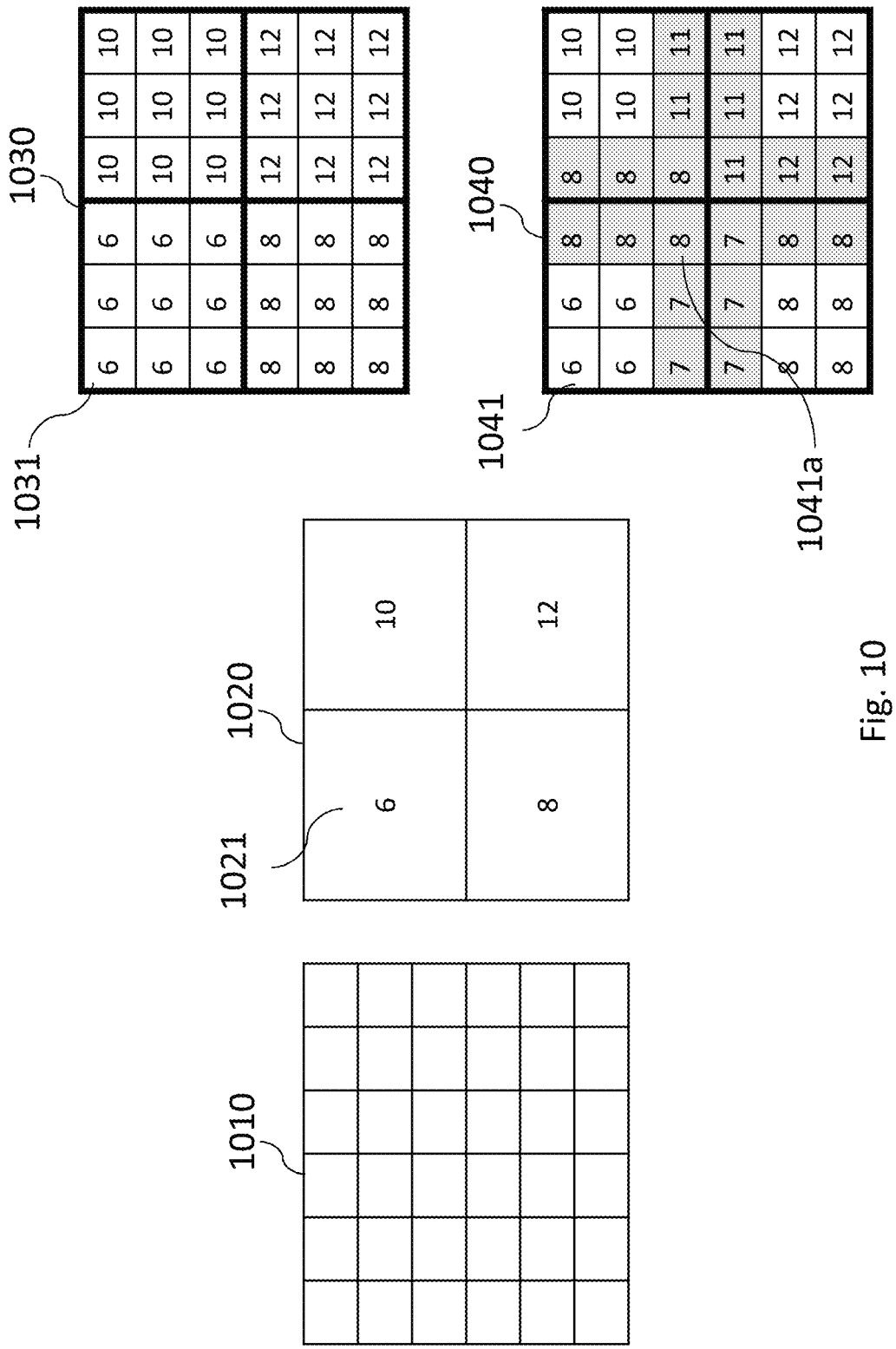
FIG. 10 is an example of a resolution adjustment performed by the system of FIG. 2A.

FIG. 10, to which reference is now made, is an example of a resolution adjustment procedure performed by pre-processing module 210 when the two representations are not in the same resolution. In the example, the resolution of a first representation 1010 is higher than the resolution of a second representation 1020, i.e. a pixel in representation 1020 is larger than a pixel in representation 1010 such that each pixel in representation 1020 covers 9 pixels in representation 1010. The lower resolution representation (representation 1020) may be adjusted to fit the higher resolution (representation 1010). Each pixel 1021 in the lower resolution representation may be divided into the number of needed pixels (e.g. 9) creating a set of new smaller pixels 1031, representing the original larger pixel.

In one embodiment, the value of each smaller pixel 1031 may be the value of the original pixel 1021 from which it was created as can be seen in representation 1030—each new smaller pixel 1031 has the same value (e.g. 6) similar to the value of the original larger pixel 1021. In another embodiment depicted by representation 1040, to create a smooth transition between the pixels, the value of inner smaller pixels 1041 may be the value of the original pixel (e.g. 6) but the value of border line smaller pixels 1041*a* (marked by a gray background) may be an average calculated between three values: the value of the original pixel (e.g. 6), the value of a vertical neighboring pixel (the value of the original pixel located above or below, if there is such a neighbor, e.g. 10) and the value of the horizontal neighboring pixel (the of the original pixel located on the right or on the left, if there is such a neighbor, e.g. 8). The value of pixel 1041*a* is therefore (6+10+8)/3=8.

Figure 11A:
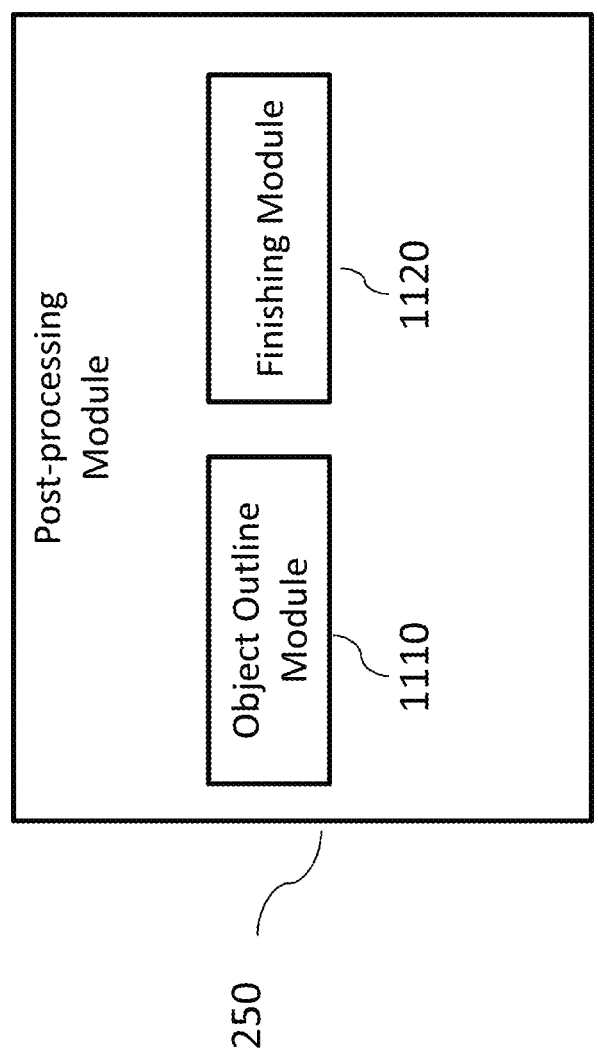
FIG. 11A is a schematic illustration of a post processing part of the system of FIG. 2A, constructed and operative in accordance with embodiments of the present invention.

FIG. 11A, to which reference is now made, is a schematic illustration of post processing module 250 that comprises an object outline module 1110 and a finishing module 1120. Post processing module 250 may create a vector of polygons, each polygon representing an object detected in the aerial image. Object outline module 1110 may select all pixels detected by top-level constructor 710 and vertical edge detector 720. Post processing module 250 may also separate between adjacent objects that do not touch each other, if there is at least one pixel separating them and mark the edges of each detected object.

Figure 11B:
FIG. 11B is an example of the outcome of the operation of object outline module of post processing part of FIG. 11A.
Figure 11C:
FIG. 11C is an example of the outcome of the operation of finishing module of post processing part of FIG. 11A.

FIG. 11B illustrates an example of the created polygons on top of an RGB raster and FIG. 11C illustrates an example of the polygons created on top of a DSM raster. When the object-surface is not completely detected, i.e. there are still undetected pixels inside the inner part of the object, finishing module 1120 may fill the missing pixels according to the polygon describing the object outline. If the lines constructing the resulting polygon are serrated (toothed), finishing module 1120 may smoothen the lines to create a straightened polygon.

It may be noted that although the examples used herein above use raster grids, system 200 (FIG. 2) may operate on any other representation (e.g. vectors).

It may be appreciated by the person skilled in the art that the steps shown in the different flows described herein are not intended to be limiting and that the flows may be practiced with more or less steps, or with a different sequence of steps, or any combination thereof.

It may also be appreciated by the person skilled in the art that the different parts of the system, shown in the different figures and described herein, are not intended to be limiting and that the system may be implemented by more or less parts, or with a different arrangement of parts, or with one or more processors performing the activities of the entire system, or any combination thereof.

Unless specifically stated otherwise, as apparent from the preceding discussions, it is appreciated that, throughout the specification, discussions utilizing terms such as "processing," "computing," "calculating," "determining," or the like, refer to the action and/or processes of a general purpose computer of any type such as a client/server system, mobile computing devices, smart appliances or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. The resultant apparatus when instructed by software may turn the general-purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for detecting objects of a specified class in an aerial image of an area, the method comprising:

magnifying differences between colors of pixels in an RGB raster of the image;

changing irregular color of pixels to values of most adjacent pixels;

magnifying differences between height of pixels in a DSM raster of the image;

changing irregular height value of pixels to values of most adjacent pixels;

selecting a first group of pixels complying with a first condition related to the color, the first condition based on the image metadata and the pre-configured rules;

selecting a second group of pixels complying with a second condition related to the height, the second condition based on the image metadata and the pre-configured rules; and creating a representation of the area from pixels common to the first group and the second group, the representation thereby comprising elements belonging to the objects of the specified class.

2. The method of claim 1 wherein the step of selecting a first group comprises:

constructing object surfaces from pixels of the representation;

detecting edges of each object surface; and selecting pixels belonging to the surfaces inside the edges.

3. The method of claim 2 wherein the step of constructing object surfaces comprising:

creating a reference representation by subtracting a predefined value from each pixel in the DSM raster;

dividing the DSM raster to first tiles having a first pre-determined size;
computing an average value of all pixels in each tile thereby creating a tile average;
subtracting the tile average from the reference representation thereby creating an elevation value for each pixel;
selecting pixels whose elevation value is positive thereby creating a first group of selected pixels; and
constructing the object surfaces from the pixels of the first group.

4. The method of claim 3 comprising:
dividing the DSM raster to second tiles having a second pre-determined size;
repeating the steps of computing, subtracting and selecting for the second tiles thereby creating a second group of selected pixels; and
constructing the object surfaces from the pixels of the first group and the pixels of the second group.

5. The method of claim 2 wherein the step of detecting edges comprises:
computing a first incline for each pixel using the height feature of adjacent pixels in the DSM raster;
computing a second incline value for each pixel using the first incline of adjacent pixels in the DSM raster; and
selecting pixels having a second incline value that is higher than a predefined threshold.

6. The method of claim 1 wherein the step of selecting a second group comprises:
creating a monochrome representation based on metadata rules by modifying the color feature of each pixel in the RGB raster; and
selecting pixels in the monochrome representation having a color feature complying with the second condition.

7. A system for creating a graphic representation of objects of a specified class detected in aerial images of an area, the system implemented on at least one processor and memory, the system comprising:
a metadata handler to select rules based on image metadata;
a pre-processing module to manipulate first and second features related to each element of the image according to the selected rules;
a first detection module to create a first group of elements complying with a first condition related to the first feature, the first condition based on the selected rules;
a second detection module to create a second group of elements complying with a second condition related to the second feature, the second condition based on the selected rules; and
a combination module to create the graphic representation containing elements common to the first group and the second group thereby creating the graphic representation of the objects of the specified class.

8. The system of claim 7 wherein the elements comprise points in a point cloud.

9. The system of claim 7 wherein the elements are pixels, the first feature is color in an RGB raster representation, and the second feature is height in a DSM raster representation.

10. The system of claim 9 wherein the pre-processing module is configured to:
magnify differences between features of pixels in each representation; and
change irregular features of pixels in each representation to features of most adjacent pixels.

11. The system of claim 10 wherein the first detection module comprises:
a top-level constructor to create object surfaces of the objects; and
a vertical edge detector to detect edges of the object surfaces wherein the first group of pixels comprises pixels of surfaces inside the edges.

12. The system of claim 11 wherein the top-level constructor is configured to:
divide the DSM raster to first tiles having a pre-determined size;
compute an average height of all pixels in each tile thereby creating a tile average height;
subtract the tile average height from a height of each pixel, thereby creating an elevation value for each pixel;
select pixels with positive elevation value thereby creating a first group of selected pixels; and
create object surfaces from the pixels of the first group.

13. The system of claim 12 wherein the top-level constructor is configured to:
divide the DSM raster to second tiles having a second pre-determined size;
repeat the steps of dividing, computing, subtracting and selecting for the second tiles, thereby creating a second group of selected pixels; and
create object surfaces from pixels in the first group and pixels in the second group.

14. The system of claim 13 wherein the second detection module is configured to:
create a monochrome representation applying the selected rules on the color feature of each pixel in the RGB raster; and
select pixels in the monochrome representation having a color feature complying with the second condition.

* * * * *